US010221822B2

(12) United States Patent
Pedlar et al.

(10) Patent No.: US 10,221,822 B2
(45) Date of Patent: Mar. 5, 2019

(54) STOP-START VEHICLE SYSTEM AND METHOD

(71) Applicant: FORD GLOBAL TECHNOLOGIES, LLC, Dearborn, MI (US)

(72) Inventors: Christopher Edward Pedlar, Chelmsford (GB); David Hesketh, Ingatestone (GB); Gary David Paisley, Romford (GB); Dilli Raj Poudel, Chigwell (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/828,811

(22) Filed: Dec. 1, 2017

(65) Prior Publication Data
US 2018/0156178 A1 Jun. 7, 2018

(30) Foreign Application Priority Data
Dec. 2, 2016 (GB) .................................. 1620522.1

(51) Int. Cl.
*F02N 11/08* (2006.01)

(52) U.S. Cl.
CPC ...... *F02N 11/0822* (2013.01); *F02N 11/0818* (2013.01); *F02N 11/0833* (2013.01); *F02N 2200/08* (2013.01); *F02N 2200/0801* (2013.01); *F02N 2200/102* (2013.01); *F02N 2300/2011* (2013.01)

(58) Field of Classification Search
CPC ............. F02N 11/0822; F02N 11/0818; F02N 11/0833; F02N 2200/08; F02N 2200/0801; F02N 2200/102; F02N 2300/2011

USPC ........................... 701/112; 123/179.4, 179.3
See application file for complete search history.

(56) References Cited

U.S. PATENT DOCUMENTS

2014/0066255 A1 3/2014 Yu et al.
2014/0067239 A1 3/2014 Doering et al.
(Continued)

FOREIGN PATENT DOCUMENTS

DE 102007016987 A1 10/2008
DE 102015209972 A1 12/2016
(Continued)

OTHER PUBLICATIONS

JP2011202845 (Araki et al.) Oct. 13, 2011 (Machine translation). [online] [retrieved on Jul. 4, 2018]. Retrieved from EPO Website.*
(Continued)

*Primary Examiner* — Mahmoud Gimie
(74) *Attorney, Agent, or Firm* — David B. Kelley; Brooks & Kushman P.C.

(57) ABSTRACT

A vehicle and method of controlling a vehicle having an engine and braking system having an associated braking pressure include stopping the engine responsive to the brake pressure being above a first threshold, restarting the engine responsive to the brake pressure falling below a second threshold, reducing the second threshold for a predetermined time after the vehicle speed falls below a speed threshold, and resetting the second threshold after the predetermined time. The predetermined time may be modified based on input from a user interface or a user-selected vehicle operating mode.

19 Claims, 3 Drawing Sheets

(56) References Cited

U.S. PATENT DOCUMENTS

2014/0297165 A1\* 10/2014 Matsunaga ........... B60W 10/06
                                                          701/112
2015/0239450 A1   8/2015 Yu et al.
2016/0272205 A1\* 9/2016 Kato ....................... B60T 7/12
2016/0311437 A1\* 10/2016 Tabuchi ........... B60W 30/18118

FOREIGN PATENT DOCUMENTS

| DE | 102017003949 A1 | 11/2017 |
| EP | 2787201 A1 | 10/2014 |
| JP | 2003035175 A | 2/2003 |
| JP | 2011202645 A | 10/2011 |
| WO | 2012042341 A1 | 4/2012 |

OTHER PUBLICATIONS

Extended European Search Report for European Application No. 17201000.1 dated May 15, 2018.
Great Britain Combined Search and Examination Report for Great Britain Application No. GB1620522.1 dated May 31, 2017.

\* cited by examiner

STOP-START VEHICLE SYSTEM AND METHOD

CROSS-REFERENCE TO RELATED APPLICATIONS

This application claims foreign priority benefits under 35 U.S.C. § 119(a)-(d) to GB Application 1620522.1 filed Dec. 2, 2016, which is hereby incorporated by reference in its entirety.

TECHNICAL FIELD

The present disclosure relates to a vehicle system and control method for operating a vehicle to provide automatic starting and stopping of a vehicle engine.

BACKGROUND

Start-stop systems configured to shut down an engine automatically when predetermined conditions are met are provided on many motor vehicles. Such systems reduce the time the engine is running during a journey performed by the vehicle and can thereby reduce fuel consumption and emissions over the journey.

For vehicles equipped with an automatic transmission, determining whether to shut down and/or restart the engine is often performed at least partially according to the operation of a brake system of the vehicle. For example, the start-stop system may be configured to shut down the engine of the vehicle when the brake pressure (or braking torque applied to the wheels) exceeds a threshold value and restart the engine when the brake pressure (or braking torque) drops below the threshold value or a further threshold value.

It is often desirable to select threshold values, or other conditions under which the engine is shut down and/or restarted, in order to maximize the reductions in fuel consumption and vehicle tailpipe emissions attained by the stop-start system. However, if the stop-start system shuts down and restarts the engine too frequently, it may become an annoyance to the driver and the driver may deactivate the stop-start system preventing any benefit to fuel consumption or vehicle emissions being achieved.

Driver preferences and driving styles, e.g. the braking behavior of drivers when bringing the vehicle to a stop, can vary significantly, and hence selecting the conditions under which the engine should be shut down and restarted by the stop-start system is challenging.

SUMMARY

According to an aspect of the present disclosure, there is provided a method of operating an engine assembly, the assembly comprising an engine and a controller configured to shut down and restart the engine automatically, wherein the controller is configured to shut down the engine when a brake pressure, or braking torque, of a brake system of the motor vehicle is above a first threshold value and restart the engine when the brake pressure, or braking torque, falls below a second threshold value, wherein the method comprises: adjusting the second threshold value according to a speed of the vehicle and returning the second threshold value to the pre-adjustment value after a predetermined period of time. In other words, the method may comprise maintaining the second threshold value at the adjusted value for a predetermined period of time, e.g. before it is returned to the pre-adjustment value. The second threshold value may be adjusted independently of the first threshold value. In this way, the conditions under which the engine is stopped automatically may be unaffected. The method may further comprise restarting the engine when the brake pressure falls below the second threshold value, e.g. the adjusted or the pre-adjustment value of the second threshold value. The second threshold value may be adjusted based on driver input or selection of a particular operating mode.

The second threshold value may be adjusted when the speed of the vehicle reaches or drops below a threshold speed. The threshold speed may be 0 m/s, in other words, the second threshold value may be adjusted when the vehicle comes to rest, e.g. stops. Alternatively, the threshold speed may be greater that 0 m/s and the second threshold value may be adjusted before the vehicle stops.

The controller may be configured to shut down the engine when the speed of the vehicle is below the threshold speed or a further threshold speed. The further threshold speed may be zero m/s. The further threshold speed may be less than the threshold speed. For example, the threshold speed may be greater than 0 m/s and the further threshold speed may be zero m/s. Alternatively, the further threshold speed may be greater than the threshold speed.

The adjusted value of the second threshold value may be less than a brake pressure, or braking torque value at which the vehicle is held stationary by the brake system, e.g. according to a gradient of the road on which the vehicle is travelling.

The method may further comprise determining a rate of change of speed of the vehicle. The second threshold pressure may be adjusted based on the rate of change of speed of the vehicle. The second threshold value may be adjusted when a rate of change of speed of the vehicle is less than a threshold rate. The second threshold pressure may be adjusted based on the rate of change of speed of the vehicle, e.g. at the point that the vehicle drops below the threshold speed. For example, the second threshold pressure may be adjusted if the rate of change of speed of the vehicle is less than the threshold rate when the vehicle drops below the threshold speed.

According to another aspect of the present disclosure, there is provided a start-stop system for a motor vehicle, the start-stop system being configured to stop an engine of the motor vehicle when a brake pressure, or braking torque of a brake system of the vehicle exceeds a first threshold value and restart the engine of the vehicle when the brake pressure of the brake system drops below a second threshold value, wherein the second threshold value is at least partially determined according to a speed of the vehicle.

According to another aspect of the present disclosure, there is provided an engine assembly for a motor vehicle, the assembly comprising: an engine; and a controller configured to shut down and restart the engine automatically, wherein the controller is configured to shut down the engine when a brake pressure, or braking torque, of a brake system of the motor vehicle is above a first threshold value and restart the engine when the brake pressure, or braking torque, falls below a second threshold value, wherein the controller is configured to adjust the second threshold value according to a speed of the vehicle and reset the second threshold value to a pre-adjustment value after a predetermined period of time.

The controller may be configured to adjust the second threshold value when the speed of the vehicle drops below a threshold speed. The controller may be configured to shut down the engine when the speed of the vehicle is below the threshold speed or a further threshold speed. The further threshold speed may be zero m/s. The further threshold speed may be less or greater than the threshold speed. For example, the threshold speed may be greater than zero m/s and the further threshold speed may be zero m/s.

The controller may be configured to maintain the adjusted value of the second threshold value for a predetermined period of time, e.g. a predetermined period of time after the speed of the vehicle has dropped below the threshold speed. The controller may be configured to return the second threshold value to the pre-adjustment value following the predetermined period of time.

The controller may be configured to adjust the predetermined period of time according to a user input. The user input may be a desired value of the predetermined period or may be a selection of a driving mode of the vehicle. The predetermined period may be adjusted according to the selected driving mode. The user input may be received from a user interface device of the vehicle.

The adjusted value of the second threshold value may be less than a brake pressure, or braking torque value at which the vehicle is held stationary by the brake system, e.g. according to a gradient of the road on which the vehicle is travelling.

The second threshold value may be adjusted independently of the first threshold value. In other words, the first threshold value may not be adjusted such that only the second threshold value is adjusted and the first threshold remains fixed.

The second threshold value may be adjusted if the brake pressure is above the first threshold value, e.g. if the engine is to be stopped automatically by the controller. The second threshold value may be adjusted if the brake pressure is above the first threshold value when or at the point that the speed of the vehicle drops below the threshold speed.

The controller may be configured to adjust the second threshold value according to a rate of change of speed of the vehicle. For example, when the rate of change of speed of the vehicle is less than a threshold rate, e.g. when a deceleration of the vehicle is low.

The controller may be configured or programmed to perform the above-mentioned method or algorithm for operating an engine of the vehicle.

A vehicle may comprise the above-mentioned engine assembly.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments are disclosed herein; however, it is to be understood that the disclosed embodiments are merely examples of the claimed subject matter that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
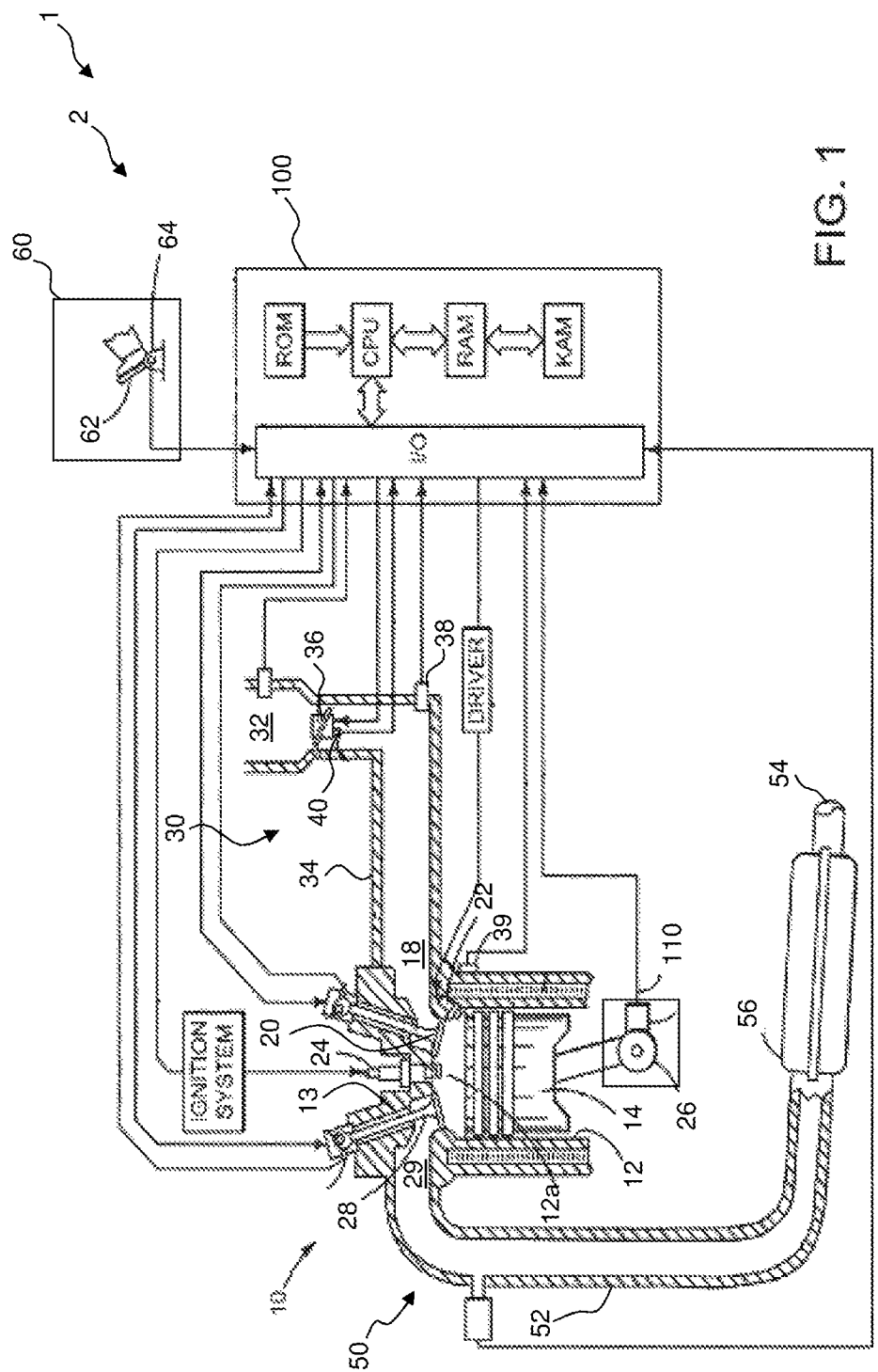
FIG. 1 is a schematic view of a vehicle having an engine assembly according to arrangements of the present disclosure.

With reference to FIG. 1, a vehicle 1 comprises an engine assembly 2. The engine assembly comprises an Internal Combustion Engine (ICE) 10 and a controller 100 configured to control the operation of the engine.

In FIG. 1, a single cylinder 12 of the engine 10 is depicted. However, the engine may comprise any desirable number of cylinders. A piston 14 is provided within the cylinder and configured to reciprocate within the cylinder 12 during a combustion cycle of the engine 10. A combustion chamber 12a of the cylinder is defined by one side of the piston 14, the walls of the cylinder 12 and a cylinder head 13.

The engine assembly 2 comprises an intake system 30 having an air inlet 32 and an intake duct 34. During operation of the engine, air is drawn into the intake system 30 via the inlet 32 and carried to an inlet manifold 18 of the engine by the intake duct 34. The intake system further comprises a throttle 36 configured to allow a pressure drop between the inlet 32 and the intake manifold 18 to be selectively varied. The position of the throttle 36 may be controlled by a driver of the vehicle to control the operation of the engine.

During an intake stroke, the piston 14 moves within the cylinder 12 to increase the volume of the combustion chamber 12a, drawing air from the inlet manifold 18 into the cylinder via an inlet valve 20. Following the intake stroke the inlet valve 20 is closed and the inlet air within the cylinder 12 is compressed as the piston 14 moves back to reduce the volume of the combustion chamber 12a. Fuel is injected into the cylinder via a fuel injector 22 and the air and fuel mixture is ignited by a spark plug 24. Combustion of the air and fuel mixture produces expanding combustion gases that act against the piston 14 to drive a crank shaft 26 of the engine 10.

In the arrangement depicted in FIG. 1, the engine 10 is a naturally aspirated spark ignition engine. However, it is equally envisaged that the present disclosure may apply to any other type of engine, such as a compression ignition engine, e.g. a diesel engine. Additionally or alternatively, the engine may be provided with one or more turbochargers, superchargers, and/or any other enhanced induction system. Furthermore, the vehicle 2 may comprise one or more additional drive systems, such as electric motors, and the engine 10 may be provided within a hybrid drive system of the vehicle 2.

After combustion is completed, combustion gases may be exhausted from the cylinder 12 via an exhaust valve 28 into an exhaust system 50 of the engine assembly 2. The exhaust system 50 comprises an exhaust duct 52 configured to carry the exhaust gases from an exhaust manifold 29 of the engine to an exhaust outlet 54, where the exhaust gases are emitted from the vehicle 1. The exhaust system further comprises one or more exhaust gas treatment modules 56, such as a catalytic convertor, configured to reduce the quantity of various components of the exhaust gases emitted from the engine 10.

As shown in FIG. 1, the intake system 30 may further comprise one or more sensors, such as a pressure sensor 38, a coolant temperature sensor 39, and a throttle position sensor 40. The sensors may be operatively coupled to the controller 100 and may provide signals to the controller indicating measurements made by the sensors. The controller 100 may process the signals in order to determine an appropriate quantity of fuel to be injected into the cylinder 12 and appropriate timings for injecting the fuel and operating the spark plug 24 to ignite the fuel and air mixture within the combustion chamber 12a.

As described above, the position of the throttle 36 may be controlled by the driver in order to control the operation of the engine 10, e.g. to control the amount of torque provided by the engine to drive the vehicle 1. For example, the throttle 36 may be coupled, e.g. mechanically coupled, to an accelerator pedal of the vehicle and the driver may control the position of the throttle directly by operating the accelerator pedal. In other arrangements, the accelerator pedal may be operatively coupled to the controller 100 and may provide a signal to the controller 100 indicating the amount that the pedal is being depressed by the driver. The controller may control the position of the throttle 36 based on the signal from the accelerator pedal in order to control the operation of the engine 10 appropriately.

In order to reduce the fuel consumption and/or emissions produced by the vehicle during a journey, the vehicle may comprise a stop-start system configured to shut down the engine 10 automatically when it is not in use and restart the engine automatically when it is required or expected to be required to power the vehicle. The stop-start system may be formed by the controller 100, or a module of the controller. The controller may be configured or programmed to determine when it may be desirable to shut down the engine 10 automatically. For example, when the vehicle is stationary and the driver is not preparing to drive away. The controller 100 may control the operation of the fuel injector 22 and/or the spark plug 24 to shut down the engine. Additionally, the controller 100 may be configured to determine when it is desirable to restart the engine, and may control the operation of a starter motor 110 coupled to the crank shaft 26 of the engine to turn over and start the engine.

In alternative arrangements, the stop-start system may comprise a further controller configured to determine when it may be desirable to shut down and restart the engine 10 automatically. The further controller may be communicatively coupled to the controller 100 and may instruct the controller 100 to control the operation of the engine 10 and starter motor 110 accordingly.

The vehicle 2 further comprises a brake system 60. The brake system comprises a brake pedal 62 that may be pressed by the driver in order to operate the brakes to slow and stop the vehicle 2. The brake system may be a hydraulic brake system and the force applied by the driver to the brake pedal 62 may determine a pressure of brake fluid within the brake system, and hence, the braking torque applied by the brake system 60 to wheels of the vehicle.

A brake pedal position sensor 64 may be provided on the brake pedal 62 configured to determine how far the driver is depressing the brake pedal. The controller 100 may receive a signal from the brake position sensor 64 and may determine a force being applied to the brake pedal and/or a pressure of the brake fluid within the brake system based on the position of the brake pedal 62. Additionally or alternatively, the brake system 60 may comprise a pressure sensor and the controller 100 may determine the pressure of brake fluid within the brake system directly from the measurements recorded by the pressure sensor.

The position of the brake pedal and/or the pressure of brake fluid within the brake system may be a useful input to the controller 100 or the further controller for determining when it may be desirable to shut down and restart the engine 10. In particular, when the brake pressure is above a threshold value, e.g. such that the car is being held stationary by the brake system, it may be desirable for the engine to be shut down. Similarly, when the brake pedal is released, e.g. when the brake pressure is reduced to below a further threshold pressure, it may be desirable to restart the engine. The braking pressure required to hold the vehicle stationary may depend on a gradient of the road at the location of the vehicle. Hence, the braking pressure applied by a driver may vary according to the gradient. It may therefore be desirable for the threshold pressure and/or the further threshold pressure to be determined based on the gradient.

Additionally, it may be desirable that the engine 10 is only shut down when the speed of the vehicle is below a threshold speed. In some arrangements, the threshold speed may be zero m/s. In other words, the engine may only be shut down when the vehicle is stationary. However, in other arrangements, the threshold speed may be greater than zero m/s to increase the amount of time the engine is stopped.

It is generally undesirable for the engine 10 to be shut down, restarted, and shut down again in quick succession. For example, during a single stop event of the vehicle. Shutting down the vehicle more than once during a single stop event may be inconvenient to the driver. Hence, the controller 100 or further controller may be configured such that the engine 10 is only shut down once during each stop event, e.g. each time the speed of the vehicle drops below the threshold speed.

In order to maximize the benefits obtained through shutting down and restarting the engine automatically, it may be desirable to configure the controller 100 such that the engine is shut down as consistently as possible when the vehicle is stopped. Hence, it may be desirable for the threshold pressure to be set as low as possible. However, setting the threshold pressure too low may result in the engine being shut down too often and at times when it is undesirable to the driver. For example, setting the threshold pressure too low may result in the engine shutting down while the driver is moving very slowly or stopped momentarily in traffic. It may therefore be desirable for the threshold pressure to be set sufficiently high that the engine is not shut down when it may be inconvenient or undesirable to the driver. The value of the threshold pressure may therefore be a compromise between maximizing the benefits to fuel consumption and emissions, and minimizing driver inconvenience.

It is generally desirable for the engine to be restarted promptly when the driver is preparing to move off from a stopped position. Hence, it may be desirable for the difference between the threshold pressure and the further threshold pressure to be small, such that the engine is restarted as the driver begins to release the brakes. In particular, if the vehicle is stopped on an incline it may be desirable that the engine is restarted before the vehicle begins to move. The further threshold pressure may therefore be greater than the brake pressure required to hold the vehicle stationary on the incline.

Driver preference may vary significantly. In particular, different drivers may have different tolerances to any delays between beginning to release the brake pedal and the engine being restarted to enable them to accelerate away from a stationary position. Additionally, driving styles, e.g. driver braking behavior, may vary significantly between drivers. For example, some drivers may apply a high brake pressure to stop the vehicle and may reduce the brake pressure significantly after the vehicle has come to a stop, whilst other drivers may modulate brake pressure constantly as the vehicle is coming to rest to give a smoother driving experience, and may in some cases increase the brake pressure once the vehicle has stopped. It is therefore challenging to determine values of the threshold pressure and further threshold pressure that are suitable for all drivers.

Figure 2:
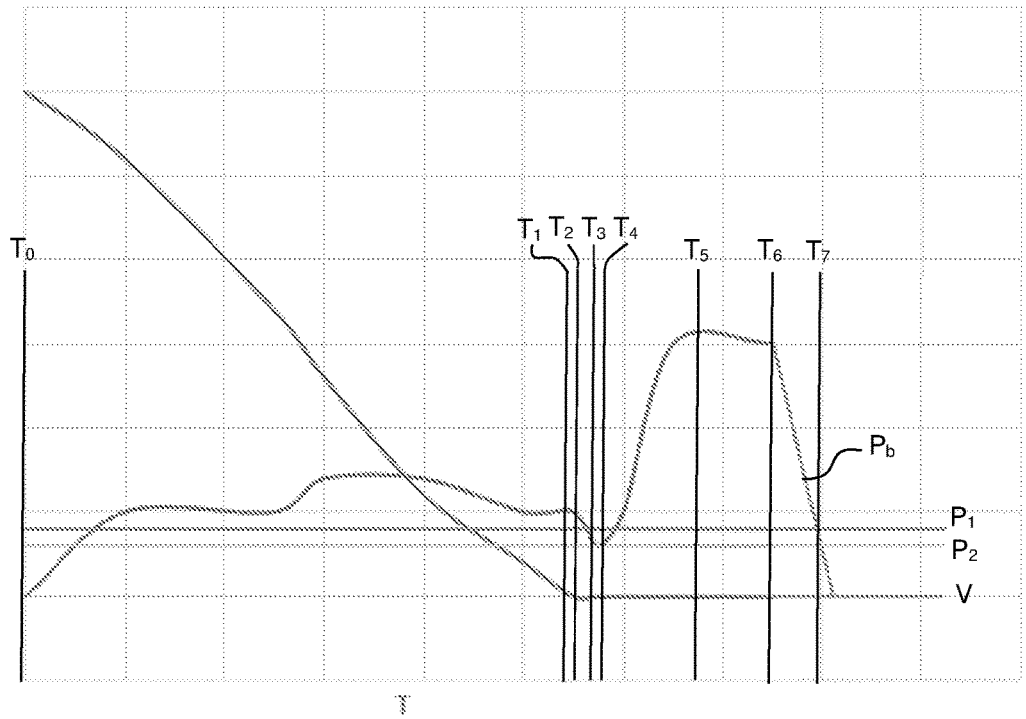
FIG. 2 is a graph showing an example of driver braking behavior.

FIG. 2 is a graph showing an example braking behavior of a driver while a vehicle is slowing to a stop. In the Figure, brake pressure $P_b$ and vehicle speed V are plotted against time T. Values of the threshold brake pressure $P_1$ and further threshold pressure $P_2$ that are being implemented by a particular controller are also indicated.

At time $T_0$ the driver begins to apply the brakes and the speed of the vehicle begins to reduce. The brake pressure is modulated by the driver as the vehicle slows and at time $T_1$ the driver begins to reduce the braking pressure immediately before the vehicle comes to a rest, to stop the vehicle smoothly.

At time $T_2$, the speed of the vehicle drops below a threshold speed at which the controller may stop the engine automatically. At time $T_2$, the brake pressure is greater than the threshold value $P_1$, and hence, the controller stops the engine automatically.

At time $T_3$, the brake pressure drops below the further threshold value $P_2$ and the controller restarts the engine automatically.

Between $T_4$ and $T_5$ the driver increases the brake pressure in order to hold the vehicle stationary. Although the brake pressure is increased above the threshold value, as the engine has recently been stopped and restarted, the controller does not shut down the engine for a second time.

At time $T_6$, the driver may begin to release the brake as the driver prepares to move away and at $T_7$ the brake pressure may drop below the further threshold pressure.

In the example described with reference to FIG. 2, the operation of the engine has not been controlled by the controller 100 to maximize the benefits of shutting down and restarting the engine during the stop event. In particular, the engine of the vehicle has been running undesirably between times $T_3$ and $T_7$.

Figure 3:
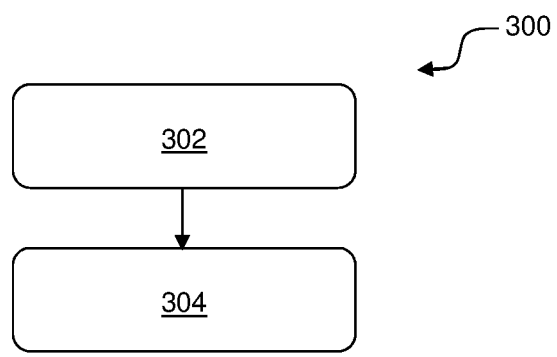
FIG. 3 shows operation of a system or method of operating an engine assembly, according to arrangements of the present disclosure.

With reference to FIG. 3, to prevent the engine being undesirably restarted at time $T_3$, the controller 100 may be configured to operate the engine using a method 300, in accordance with the present disclosure. The method 300 comprises a first step 302, in which the engine 10 is shut down. As described above, the engine may be shut down when the brake pressure of the brake system is above a threshold pressure and optionally when speed of the vehicle is below a threshold speed. The method further comprises a second step 304 in which the further threshold pressure is adjusted, e.g. reduced, according to the speed of the vehicle. For example, the further threshold pressure may be reduced when the speed of the vehicle reaches or drops below a further threshold speed.

The further threshold speed may be zero m/s. In other words, the further threshold pressure may be reduced as the vehicle comes to rest. In some arrangements, the further threshold speed may be equal to the threshold speed. Alternatively, the further threshold speed may be less than the threshold speed. For example, the further threshold speed may be zero m/s and the threshold speed may be greater than zero m/s. In other arrangements, the further threshold speed may be greater than the threshold speed.

In the second step 304, the further threshold pressure may be reduced by a predetermined pressure difference to an adjusted threshold pressure. The adjusted threshold pressure may be maintained for a predetermined period of time and following the predetermined period of time the further threshold pressure may be returned to its original, e.g. pre-adjustment, value.

As described above, it is often undesirable for the further threshold pressure to be greater than a value at which the brake system is able to hold the vehicle stationary on an incline. However, in some cases, the brake pressure applied by the driver between times $T_3$ and $T_4$ may drop below this value, and hence, the adjusted threshold pressure may be less than the value at which the brake system is able to hold the vehicle stationary on an incline.

In some arrangements, the second step 304 may be performed independently of the first step 302. In other words, the further threshold pressure may be adjusted when the vehicle reaches or drops below the threshold speed regardless of whether the engine has been shut down. The further threshold pressure may be adjusted independently of the threshold pressure such that the adjustment does not affect the conditions under which the engine is shut down automatically.

In other arrangements, the second step 304 may be performed only when the engine has been or is about to be shut down. The further threshold pressure may be adjusted if the brake pressure is greater than the threshold pressure when the vehicle reaches or drops below the threshold speed.

Figure 4:
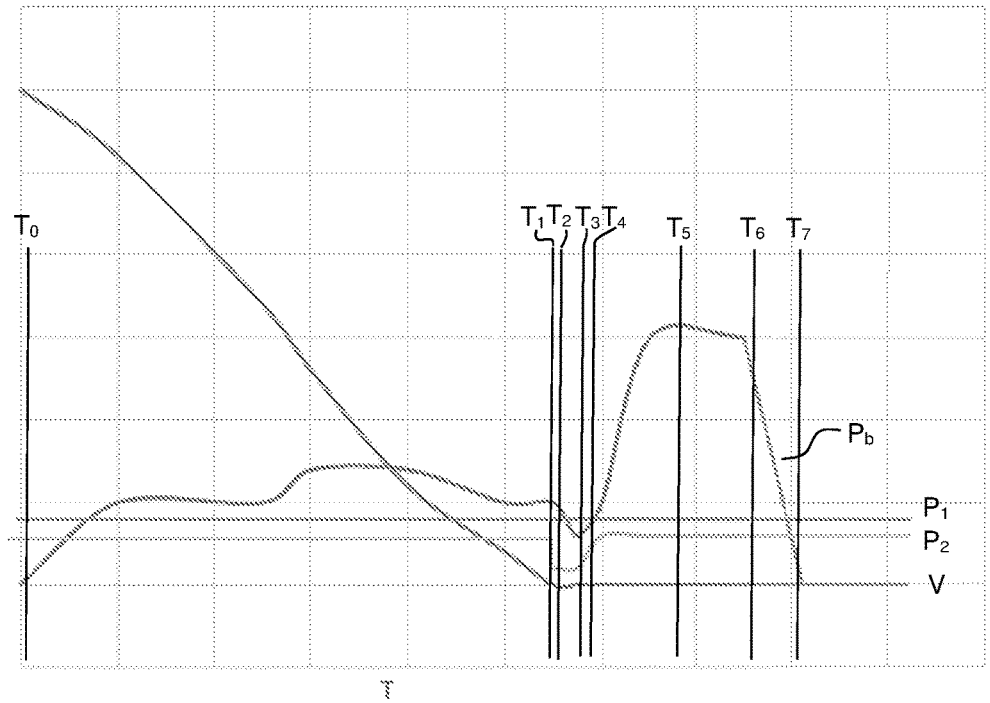
FIG. 4 is a graph showing driver braking behavior and adjustments made to a threshold braking pressure in a system or method according to the present disclosure.

FIG. 4 illustrates the braking behavior of the driver slowing the vehicle to a stop in the same manner as shown in FIG. 2. Values of the threshold brake pressure $P_1$ and further threshold pressure $P_2$ that are implemented by the controller 100 applying the method 300 are also indicated.

As shown in FIG. 4, by adjusting the further threshold pressure $P_2$ in the second step 304, the method 300 prevents the brake pressure dropping below the further threshold pressure at $T_3$, and hence, the engine is not restarted undesirably. Furthermore, as the further threshold pressure is returned to its original value after the predetermined period of time, the time between $T_6$, when the driver begins to release the brake as the driver prepares to move away, and $T_7$, when the brake pressure may drop below the further threshold pressure, is unaffected by the adjustment made to the further threshold pressure. In this way, the controller 100 may compensate for the braking behavior of the driver without increasing the delay experienced by the driver between beginning to release the brakes and the engine being restarted.

The length of the predetermined period of time for which the further threshold pressure $P_2$ is maintained at the adjusted value may determine the amount of time that the driver can reduce the brake pressure as the vehicle comes to a stop without the engine being restarted automatically. The predetermined period may be calibrated, e.g. set, during production of the vehicle. The predetermined period may be set according to the vehicle in which the controller 100 is installed. For example, the predetermined period may be set according to the size and/or configuration of the vehicle and/or the style of driving expected to be performed using the vehicle. In some arrangements, it may be desirable for the driver of the vehicle to adjust the predetermined period to a desired value that suits the driver's driving style. The vehicle 1 may comprise a user interface device configured to allow the user to adjust the predetermined period applied by the controller 100. Additionally or alternatively, the predetermined period may be adjusted according to a driving mode selected by the driver. The driving mode may be selected using the user interface device or another control provided on the vehicle.

Using the method 300 to adjust the further threshold pressure may be particularly beneficial when the driver is bringing the vehicle to a smooth stop and is likely to reduce the braking pressure as the vehicle comes to a stop. It may therefore be desirable for the controller to determine a rate of change of speed of the vehicle. For example, the controller 100 may adjust the further threshold pressure, e.g. by performing the second step 304 of the method, only if the rate of change of speed of vehicle is below a threshold rate.

It will be appreciated by those skilled in the art that although the claimed subject matter has been described by way of example, with reference to one or more examples, it is not limited to the disclosed examples and that alternative examples could be constructed without departing from the scope of the appended claims.

While example embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A method of controlling a vehicle having an engine and braking system having an associated brake pressure, comprising, by a vehicle controller:
    stopping the engine responsive to the brake pressure being above a first threshold;
    restarting the engine responsive to the brake pressure falling below a second threshold;
    reducing the second threshold for a predetermined time based at least in part on a driver-selected vehicle operating mode; and
    resetting the second threshold after the predetermined time.

2. The method of claim 1 wherein the speed threshold is zero.

3. The method of claim 1 wherein stopping the engine comprises shutting down the engine only when the speed of the vehicle is below the speed threshold.

4. The method of claim 1 wherein reducing the second threshold comprises reducing the second threshold to less than a brake pressure at which the vehicle is held stationary by the braking system.

5. The method of claim 1 wherein reducing the second threshold is performed independently of the first threshold value.

6. The method of claim 1 wherein the first and second thresholds are equal prior to reducing the second threshold.

7. The method of claim 1 wherein the first threshold is greater than the second threshold.

8. The method of claim 1 further comprising determining a rate of change of speed of the vehicle, wherein the speed threshold comprises a rate of change of speed.

9. The method of claim 1 wherein the predetermined time is based on input received via a vehicle user interface.

10. The method of claim 1 wherein the predetermined time is set according to a size or configuration of the vehicle.

11. A vehicle comprising:
    an engine;
    a braking system having a braking pressure; and
    a controller configured to stop the engine responsive to the brake pressure being above a first threshold and vehicle speed being below a speed threshold, restart the engine responsive to the brake pressure falling below a second threshold, reducing the second threshold for a predetermined time after stopping the engine, and resetting the second threshold after the predetermined time.

12. The vehicle of claim 11 wherein the controller performs the reducing of the second threshold in response to the vehicle speed being zero.

13. The vehicle of claim 11 wherein the controller adjusts the predetermined time responsive to input received from a vehicle user interface.

14. The vehicle of claim 11 wherein the controller adjusts the predetermined time response to a user-selected vehicle operating mode.

15. The vehicle of claim 11 wherein the controller reduces the second threshold to less than the braking pressure at which the vehicle is held stationary by the braking system.

16. The vehicle of claim 11 wherein the first threshold is greater than the second threshold before the controller reduces the second threshold.

17. A vehicle comprising:
    an engine;
    a braking system having a braking pressure; and
    a controller configured to stop the engine responsive to the braking pressure exceeding a first threshold, restart the engine responsive to the braking pressure falling below a second threshold, reduce the second threshold for a predetermined time after the engine stops, and increase the second threshold after the predetermined time.

18. The vehicle of claim 17 wherein the controller is further configured to modify the predetermined time in response to input received from a user interface.

19. The vehicle of claim 17 wherein the controller is further configured to modify the predetermined time in response to a user-selected vehicle operating mode.

* * * * *